United States Patent [19]
Yamada et al.

[11] Patent Number: 5,274,624
[45] Date of Patent: Dec. 28, 1993

[54] OPTICAL RECORDING MEDIUM

[75] Inventors: Takashi Yamada; Fumio Matsui, both of Saitama, Japan

[73] Assignee: Pioneer Electronic Corporation, Tokyo, Japan

[21] Appl. No.: 800,105

[22] Filed: Nov. 29, 1991

[30] Foreign Application Priority Data

Feb. 13, 1991 [JP] Japan ................................ 3-020026

[51] Int. Cl.⁵ .................... G11B 7/24; B41M 5/26; C09B 27/00
[52] U.S. Cl. ..................... 369/275.1; 369/283; 369/288; 428/65; 430/935; 430/945
[58] Field of Search ............... 369/288, 275.1, 275.5, 369/283, 280, 275.4; 428/65, 64, 913, 480; 430/945, 935

[56] References Cited

U.S. PATENT DOCUMENTS

| | | | |
|---|---|---|---|
| 4,300,227 | 11/1981 | Bell | 369/275 |
| 5,002,812 | 3/1991 | Umehara et al. | 369/288 |
| 5,021,276 | 6/1991 | Kamezaki et al. | 369/288 |
| 5,090,009 | 2/1992 | Hamada et al. | 369/275.4 |
| 5,132,153 | 7/1992 | Hirose et al. | 428/64 |

Primary Examiner—Paul M. Dzierzynski
Assistant Examiner—Kim-Kwok Chu
Attorney, Agent, or Firm—Sughrue, Mion, Zinn, Macpeak & Seas

[57] ABSTRACT

An optical recording medium comprises a substrate and a recording layer provided on the substrate, and the recording layer contains a recording material having a property in that a difference in temperature between decomposition point of the recording material and melting point thereof is not more than 100° C. In result, the recording layer is capable of forming a complete pit, and the medium has superior reproduction characteristics.

7 Claims, 1 Drawing Sheet

OPTICAL RECORDING MEDIUM

BACKGROUND OF THE INVENTION

This invention relates to optical recording mediums and, more particularly, to an optical recording medium comprising a recording layer, having a characteristic of forming small halls called pits with a recording light such as laser beam.

Ordinarily, optical recording mediums have superior characteristics, such that they have a large storage capacity and are capable of effecting writing or reading in a non-contact manner. Optical recording mediums have therefore been developed extensively.

A write once type optical disk is known as an example of optical recording mediums. This type of optical disk is used in such a manner that a laser beam is condensed to a very small area on a recording layer and is converted into thermal energy to change the state of the recording layer (forming pits) thereby to write data, and that the corresponding data is reproduced in accordance with changes in the quantity of light reflected on recording portions and non-recording portions.

Preferably, the recording layer of such a medium is formed of a material capable of achieving a large change in reflectivity. Further, it is necessary to use non-toxic material for forming the recording layer, to improve the sensitivity of medium and to reduce the manufacture cost. Therefore, optical recording mediums having a recording layer formed of an organic material mainly constituted by a coloring matter have been proposed. However, a conventional recording material is not sufficiently available, because there are many cases where pits in the recording layer formed with irradiation of laser beam are out of shape. That is, as an end portion of the pit is formed of fused and flowed recording material, the pit is in the shape of so-called ellipticity having a tail. Therefore, a so-called "hump phenomenon" is observed in a reproduction waveform. In result, it is difficult to have superior reproduction characteristics.

SUMMARY OF THE INVENTION

An object of the present invention is to substantially eliminate the defects or drawbacks encountered in the prior art and to provide an optical recording medium having a recording layer capable of forming a complete pit or regular pit, and having superior reproduction characteristics.

This and other objects can be achieved according to the present invention by providing an optical recording medium comprising a substrate and a recording layer provided on the substrate and having a characteristic of forming small pit, wherein the recording layer contains a recording material having a property in that a difference in temperature between decomposition point and melting point is not more than 100° C.

The above object and features of the present invention will appear more fully hereinafter from a consideration of the following description taken in connection with the accompanying drawings.

BRIEF DESCRIPTION OF THE DRAWINGS

In the accompanying drawings.

DESCRIPTION OF THE PREFERRED EMBODIMENT

Figure 1:
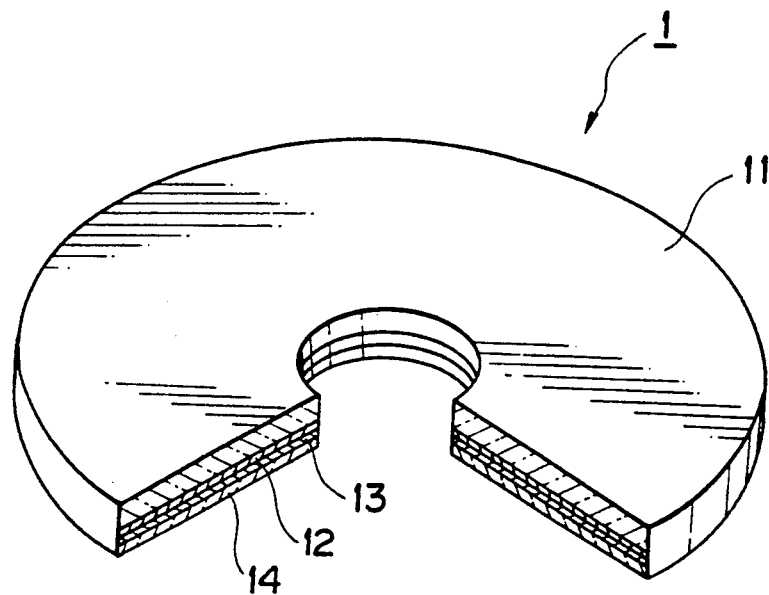
FIG. 1 is a schematic perspective view, partially cut away, of an optical recording medium according to the present invention.
Figure 2:
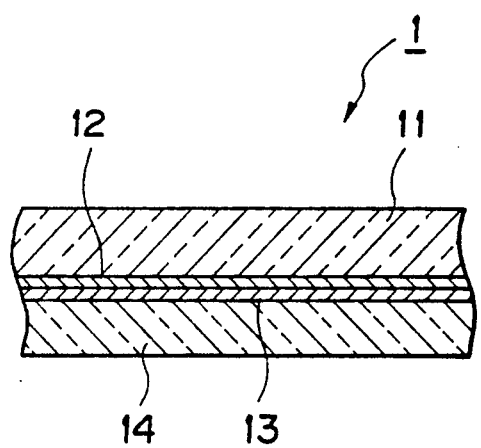
FIG. 2 is an enlarged view of the cut-out surface of the optical recording medium of FIG. 1.

As one embodiment of the present invention, an optical recording medium which is able to meet CD (compact disk) standards and which can be reproduced with a CD (compact disk) player for the livelihood of the nation use (or the people's livelihood use) is described below with reference to accompanying drawings. As shown in FIG. 1, the optical recording medium according to the present invention is constructed to comprise a light transmissive substrate 11, a recording layer 12 provided on the light transmissive substrate 11, a light reflecting layer 13 provided on the recording layer 12, and a protective layer 14 provided on the light reflecting layer 13.

Preferably, an injection-molded substrate is used as the light transmissive substrate 11 in accordance with the present invention to improve the productivity. The injection-molded substrate is formed in such a manner that material is integrally molded by one-shot injection molding into a flat plate-like substrate with grooves, addresses and so on formed on one surface of the substrate.

This substrate 11 is formed of a plastic material such as a polycarbonate (PC) resin or a polymethylmethactylate (PMMA) resin, and has thickness of 1.0 to 1.5 mm.

On such a substrate 11 is formed the recording layer 12, in which a recording material is contained. The recording material has a property (or characteristic) in that a difference in temperature between decomposition point and melting point is not more than 100° C., in particular 0° to 70° C. Decomposition point is defined as a starting temperature of thermal decomposition measured at atmospheric pressure. If the difference in temperature exceeds the upper limit of 100° C., a pit in the recording layer formed with irradiation of laser beam is out of shape. That is, as an end portion of the pit is formed of fused and flowed recording material, the pit is in the shape of a so-called ellipticity having a tail. Therefore, it is not able to have superior reproduction because of a so-called "hump phenomenon" observed in a reproduction waveform.

The recording material having the abovementioned property, for example, is found out in cyanine type dye compounds.

The recording layer containing the above-described recording material is formed by the ordinary means, e.g., the spin coating method. The thickness of the formed recording layer is about 20 to 2000 nm. A solvent used for coating may be, for example, diacetone alcohol, ethyl cellosolve, methyl cellosolve, isophorone, methanol, tetrafluoropropanol or dichloroethane.

The recording layer in accordance with the present invention further may contain a quencher compound for preventing the photo-degradation of the recording material.

The laser light applied to the recording medium in accordance with the present invention is selected according to the wavelength of light absorbed by the recording material contained in the recording layer. Specifically. semiconductor laser light (wavelength: 760 to 830 nm) is preferred.

The light reflecting layer 13 is provided on the recording layer 12. The light reflecting layer 13 is substantially formed of a metal such as Au, Ag, Cu, Al, etc.

The metal is coated on the recording layer 12 to form the light reflecting layer 13 by utilizing one of various kinds of vapour depositions such as vacuum evaporation, spattering, and ion-plating, etc. Such a light reflecting layer 13 may preferably have a thickness of 0.02 to 2.0 μm.

Furthermore, it may be preferred to provide the protective layer 14 on the light reflecting layer 13 so as to protect the light absorption layer 12 and light reflecting layer 13. The protective layer 14 is generally formed by spin-coating an ultra-violet setting resin onto the light reflecting layer 13 to form a coated film. Then, the coated film is cured by ultra-violet beam irradiated thereto. In this regard, other materials such as epoxy resin, acrylic resin, silicone resin are used as material for the protective layer 14. The thickness of the protective layer 14 is usually set in a range of 0.1 to 100 μm.

Furthermore, an intermediate layer may preferably be interposed between the substrate 11 and the recording layer 12 so as to protect the substrate 11 from being injured by the solvent. A further intermediate layer may be provided between the recording layer 12 and the light reflecting layer 13 in order to increase the efficiency of light absorption.

When a recording light beam is irradiated in a pulse mode to the optical recording medium according to the present invention under the condition of the medium being rotated, a part of the recording layer 12 is melted and removed resulting in forming signal pit.

Such a prepared signal pit is picked up as information by detecting a difference of light amounts between an incident light and a reflected light of a readout light.

Detailed explanation will now be further described with reference to examples and comparative examples to be enumerated hereinafter.

EXAMPLE 1

The following recording material [D-1] was prepared which is to be contained in the recording layer.

Recording Material

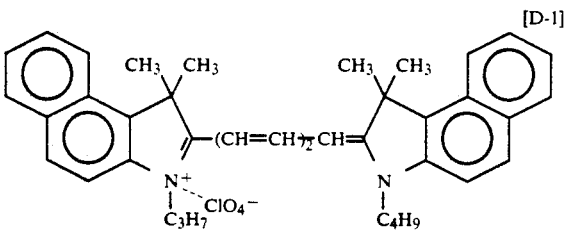

Melting Point: 200° C.
Decomposition Point: 240° C.

The thus prepared recording material was dissolved into ethyl cellosolve as a solvent to prepare a coating solution having a recording material concentration of 30 mg/ml Then, the coating solution was coated on a polycarbonate substrate having a diameter of 120 mm and a thickness of 1.2 mm to form a recording layer having a thickness of 60 nm. The polycarbonate substrate was used as a transparent substrate on which spiral grooves were previously formed by utilizing an injection molding method. Furthermore, Au (gold) was vacuum evaporated onto the recording layer, resulting in forming a light reflecting layer having a thickness of 1000 Å. Then a protective film formed of a photopolymer was laminated onto the light reflecting layer to form a protective layer having a thickness of 5 μm, thereby to prepare an optical recording medium sample of the present invention.

EXAMPLE 2

An optical recording medium was prepared according to the substantially same procedure as that of Example 1 except that the recording material employed in Example 1 was replaced by a following recording material shown as [D-2].

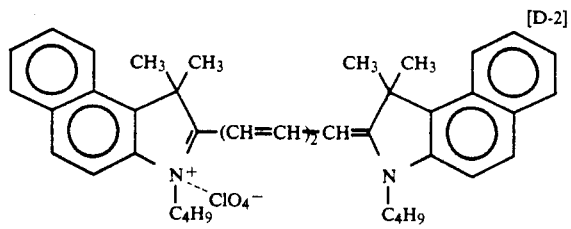

Melting Point: 173° C.
Decomposition Point: 225° C.

COMPARATIVE EXAMPLE 1

An optical recording medium was prepared according to the substantially same procedure as that of Example 1 except that a recording material shown below as [D-3] was employed in place of the recording material used in Example 1.

R5: Alkyl Group
R: Alkyl Group
Pc: Phthalocyanine
Melting Point: 130° C.-150° C.
Decomposition Point: 300° C. and over

COMPARATIVE EXAMPLE 2

An optical recording medium was prepared according to the substantially the same procedure as that of Example 1 except that the recording material employed in Example 1 was replaced by a following recording material shown as [D-4]

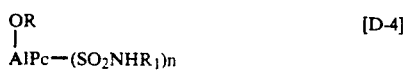

R1: Alkyl Group
R: Alkyl Group
n: 1 or 2
Pc: Phthalocyanine
Melting Point: 180-200° C.
Decomposition Point: 300° C. and over Using each of thus prepared optical recording medium samples, recording and reproducing test was performed under conditions described below.

Test Conditions wave length: 778 nm, linear velocity: 1.4 m/s
write power: 6.0 mW
read power: 0.5 mW As the result of the aforementioned test, it was confirmed that a so-called "hump phenomenon" was not observed in reproduced waveforms of the optical recording mediums of the present invention because of being formed nearly complete pits in the recording layer. On the other hand, according to comparative samples 1 and 2, the "hump phenomena" were observed in reproduced waveforms, respectively, and these samples were confirmed not to be suitable in practical use.

The effects of the present invention are apparent from the foregoing. That is, the optical recording medium in accordance with the present invention has a recording layer containing a recording material which has a property in that the difference in temperature between decomposition point and melting point is not more than 100° C.

In result, complete pit or regular pit is formed in the recording layer with irradiation of a recording light, so that the medium of the present invention has superior reproduction characteristic.

What is claimed is:

1. An optical recording medium, comprising:
    a substrate; and
    a recording layer provided on the substrate and having a characteristic of forming pit, wherein said recording layer contains a recording material having a property in that a difference in temperature between a decomposition point of the recording material and a melting point thereof is 100° C. or less.

2. An optical recording medium according to claim 1, wherein said recording material is a cyanine type dye.

3. An optical recording medium according to claim 1, wherein said substrate is formed of a polycarbonate resin.

4. An optical recording medium according to claim 1, wherein said recording layer further contains a quencher compound.

5. An optical recording medium for use with a compact disk player, comprising:
    a light transmissive substrate having a thickness of 1.0 to 1.5 mm,
    a recording layer provided on the substrate and having a thickness of 20 to 2000 nm,
    a reflecting layer provided on the recording layer and having a thickness of 0.02 to 2.0 $\mu$m, and
    a protective layer provided on the reflecting layer and having a thickness of 0.1 to 100 $\mu$m, wherein said recording layer contains a recording material having a property in that a difference in temperature between a decomposition point of the recording material and a melting point thereof is 100° C. or less.

6. An optical recording medium according to claim 5, wherein said recording layer contains a recording material having a property in that a difference in temperature between said decomposition point and said melting point is 70° C. or less.

7. An optical recording medium according to claim 5, wherein the light reflecting layer contains at least one metal selected from the group consisting of gold (Au), silver (Ag), copper (Cu) and aluminium (Al).

* * * * *